United States Patent [19]
Herwig

[11] 3,911,342
[45] Oct. 7, 1975

[54] PLUG CURRENT SENSOR FOR TRACTION MOTOR

[75] Inventor: Warren E. Herwig, Wind Lake, Wis.

[73] Assignee: Allis-Chalmers Corporation, Milwaukee, Wis.

[22] Filed: Aug. 5, 1974

[21] Appl. No.: 494,841

[52] U.S. Cl. ............... 318/373; 318/374; 318/269
[51] Int. Cl.² .......................................... H02P 3/12
[58] Field of Search ........... 318/373, 374, 269, 273; 335/151, 154

[56] References Cited
UNITED STATES PATENTS

| | | | |
|---|---|---|---|
| 2,167,530 | 7/1939 | Schneider | 318/269 |
| 3,046,462 | 7/1962 | Hampson | 318/373 X |
| 3,130,357 | 4/1964 | Westlake et al. | 318/374 X |
| 3,344,328 | 9/1967 | Morris | 318/269 X |
| 3,715,642 | 2/1973 | Walter | 318/269 |

*Primary Examiner*—B. Dobeck
*Attorney, Agent, or Firm*—Lee H. Kaiser

[57] ABSTRACT

A vehicle driven by a d.c. traction motor energized from a battery has plugging means to dynamically brake the motor, an armature diode in shunt to the motor armature, and a plug current sensor including a ferromagnetic shielding and current carrying link connected in series with the armature diode and having a transverse depression and a constricted portion of reduced cross sectional area and also including a reed relay for controlling the plugging means disposed in the depression so that its contacts are operated by the magnetic field concentrated in the constricted portion of the link to thereby increase the sensitivity of the current sensor and prevent erratic plugging.

9 Claims, 5 Drawing Figures

PLUG CURRENT SENSOR FOR TRACTION MOTOR

BACKGROUND OF THE INVENTION

Vehicles such as lift trucks are often driven by a d.c. series traction motor energized from a battery, and vehicle speed may be regulated by a time-ratio control which varies the average power input to the traction motor. For example, regulation of the average power input to a traction motor is often accomplished by a pulse width modulation system in which a controlled semiconductor power switch in series with the battery and motor is switched between the "on" state and the "off" state at a constant repetition rate. Such a pulse width modulation system may apply variable width pulses of voltage to the motor in order to vary the duty cycle of the semiconductor and the average power input to the motor. Other known time-ratio controls energize a traction motor through a controlled rectifier which is fired at an adjustable frequency by a relaxation oscillator to vary the average voltage supplied to the motor. A free wheeling diode is commonly connected in shunt to the inductive motor circuit to provide a path for the inductive current when the semiconductor switch is open and thus prevent abrupt current change and resultant high voltage across the semiconductor switch. The free wheeling diode shunting the series combination of motor armature and field winding maintains the flow of current to the motor during the interpulse period and reduces motor ripple current. An armature diode is commonly connected in shunt to the motor armature and provides a path for armature current flow during braking.

It is known to control electrodynamic braking, or plugging of a d.c. traction motor by sensing the forward voltage across the free wheeling diode, or across the armature diode. When the vehicle is moving in a direction opposite to that called for by the direction controls, the motor acts as a generator pumping current through the armature diode, and consequently the magnitude of current flow through the diode increases greatly. However, control systems which sense the forward voltage drop across the armature diode (or across the free wheeling diode) to regulate dynamic braking often provide erratic and inconsistent plugging because the triggering point may vary with change in motor characteristics. The forward voltage drop across a diode is not directly related to the magnitude of current flowing through the diode, and such nonlinearity contributes to erratic plugging.

Electromagnetic plug current sensors for a d.c. traction motor regulated by a time-ratio control have not been commercially successful. The high magnitude of d.c. current supplied from battery to motor and chopped at relatively high frequency by the power switch and flowing in electrical cables adjacent the panel incorporating the electromagnetic plug current sensor generates magnetic fields which may cancel or strengthen the field generated by the current to be sensed and may thus result in faulty indications by the sensor and limits its sensitivity.

OBJECTS OF THE INVENTION

It is an object of the invention to provide an improved plug current sensor for a vehicle traction motor. Another object is to provide such an improved plug current sensor which operates in response to a predetermined magnitude of plugging current through a diode shunting the inductive motor path and provides consistent plugging regardless of variations in motor characteristics. A further object is to provide such an improved plug current sensor for a vehicle traction motor whose response is not influenced by external magnetic fields generated by high magnitudes of chopped d.c. current flowing in electrical cables adjacent the sensor.

A still further object is to provide an improved plug current sensor which is low in cost but has high and constant sensitivity and whose response is not affected by external magnetic fields. Another object is to provide a control panel for a vehicle driven by a d.c. traction motor including the unitary assembly of a diode shunting the inductive motor path and a high sensitivity current sensor for detecting a predetermined magnitude of current flow through the diode and which provide consistent plugging regardless of variations in motor characteristics.

SUMMARY OF THE INVENTION

A vehicle driven by a d.c. traction motor energized from a battery through a time-ratio control has plugging means to dynamically brake the motor, a diode in shunt to the inductive motor path, and a high sensitivity plug current sensor which is not influenced by external magnetic fields generated by heavy chopped currents to the motor flowing in adjacent electrical cables comprising a ferromagnetic shielding and current carrying link connected from series with the diode and having a transverse depression therein and a constricted neck portion of reduced cross sectional area and a reed switch for controlling the plugging means positioned in the depression in the link so its contacts are operated by the magnetic field generated by the current flowing through the link and concentrated in this constricted neck portion thereof.

DESCRIPTION OF THE DRAWINGS

These and other objects and advantages of the invention will be more readily apparent from consideration of the following detailed description when considered together with the accompanying drawing wherein.

DETAILED DESCRIPTION

Figure 1:
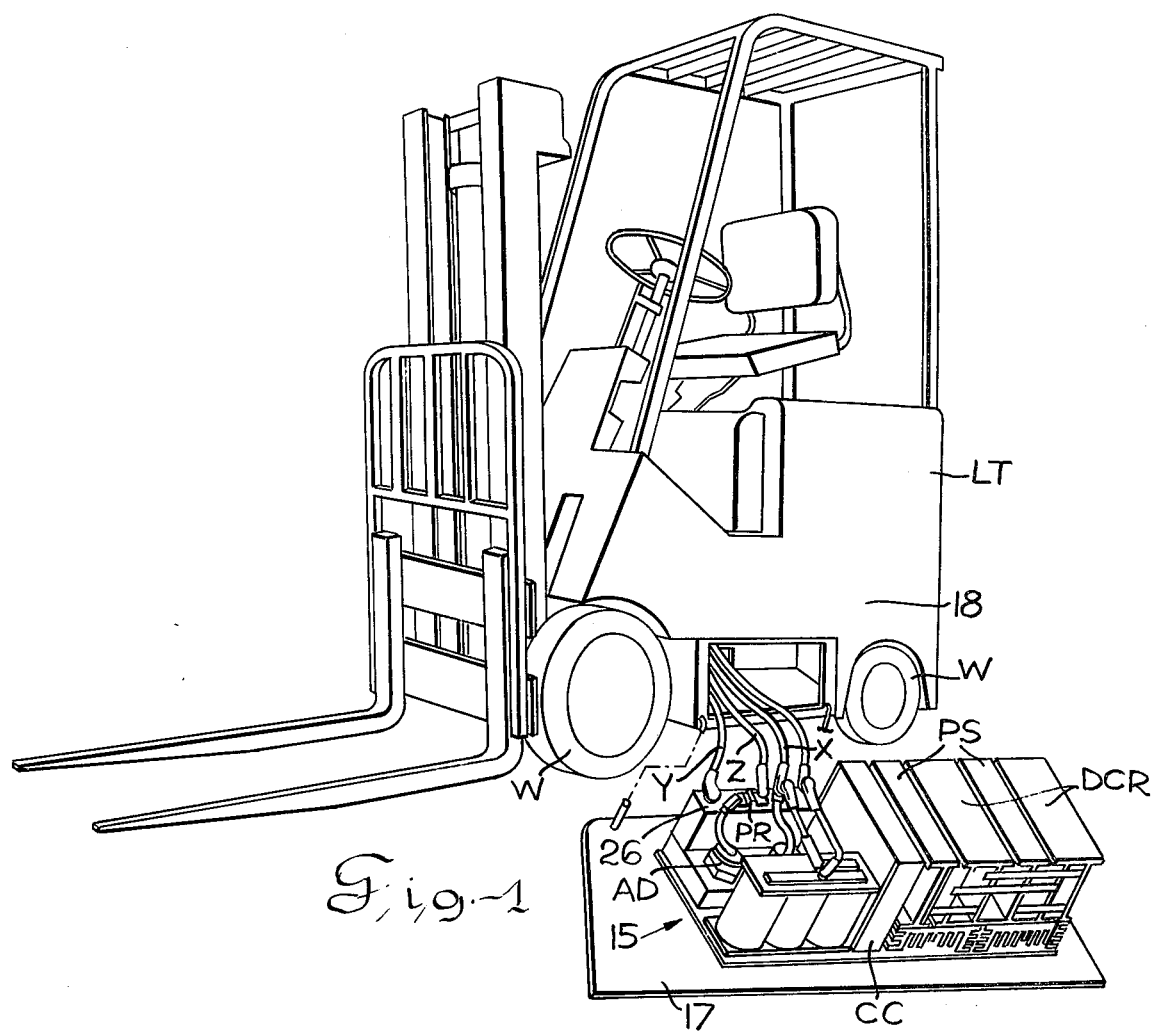
FIG. 1 is a perspective view of a lift truck incorporating this invention with a compartment door shown open and enlarged to illustrate the control panel mounted on the door and the adjacent electrical cables which generate magnetic field that, in the absence of the invention, may cause erratic plugging.
Figure 3:
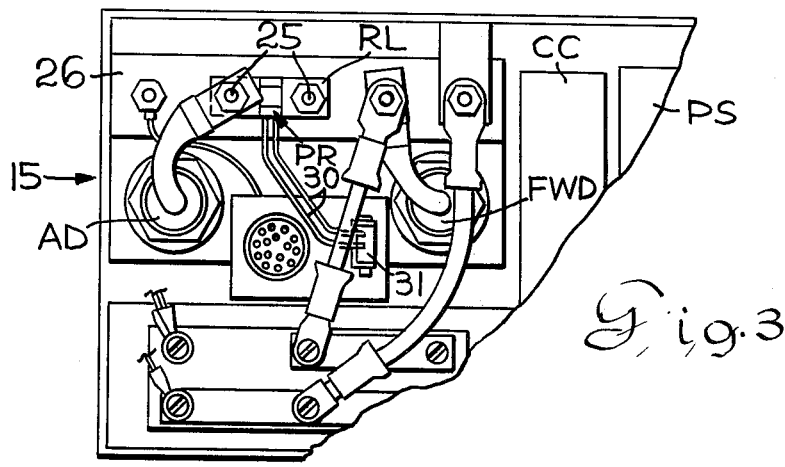
FIG. 3 is a partial view of the control panel shown in FIG. 1.
Figure 2:
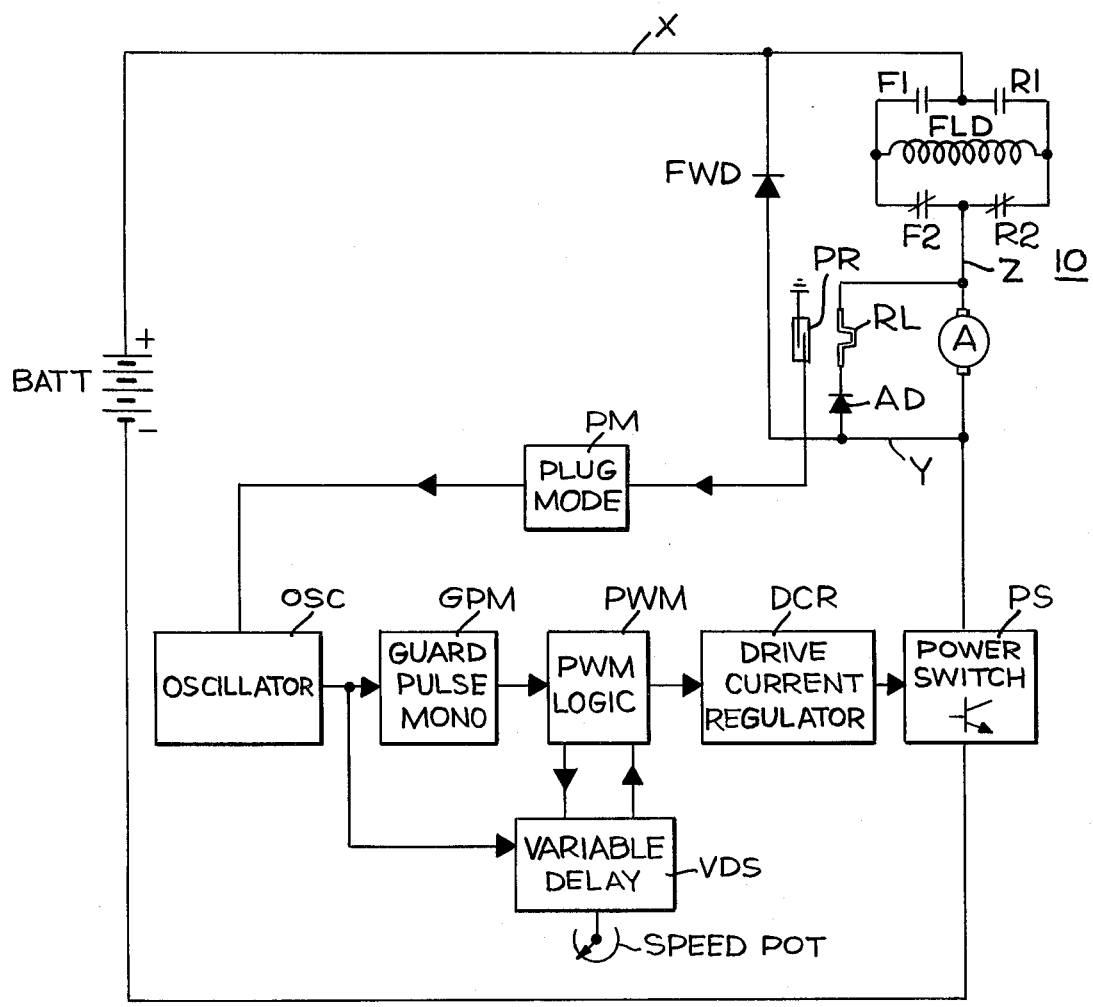
FIG. 2 is a schematic block diagram of the timeratio control for the lift truck of FIG. 1 and incorporating the improved plug current sensor.
Figure 5:
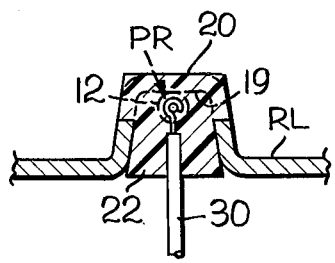
FIG. 5 is a view taken along line V—V of FIG. 4.
Figure 4:
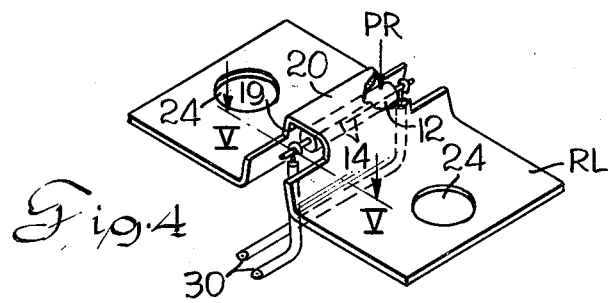
FIG. 4 is a perspective view of the improved plug current sensor.

The wheels W of a vehicle such as a fork lift truck LT shown in FIG. 1 may be driven by a series traction motor 10 (see FIG. 2) having an armature A and a field winding FLD connected in series with a semiconductor power switch PS across the terminals of a battery BATT through the normally open controls F1 of a forward contactor and the normally closed controls R2 of a reverse contactor to drive the truck in a forward direction, or through the normally open controls R1 of the reverse contactor and the normally closed contacts F2 of the forward contactor to propel the truck to the rear. Motor 10 may be energized by unidirectional pulses of current conducted by power switch PS. The speed of motor 10 may be regulated by a variable time-ratio control, such as the pulse width modulation (PWM) control disclosed in U.S. Pat. Nos. 3,803,471 to F. A. Stich; 3,813,473 to F. A. Stich and R. G. Price and 3,828,235 to R. G. Price and F. A. Stich, and in application Ser. No. 317,596 of F. A. Stich filed Dec. 22, 1972, having the same assignee as this invention, which controls the duty cycle of variable width pulses of voltage from battery BATT applied to motor 10 by power switch PS to proportionally vary the average voltage applied to the motor 10. An oscillator OSC provides a train of triggering pulses which sets the frequency of the PWM system and is adapted when triggered by a PLUG MODE circuit to switch to a low frequency mode wherein the frequency of the triggering pulses is reduced in the manner disclosed in aforementioned U.S. Pat. No. 3,828,235. Each pulse from oscillator OSC triggers a guard pulse monostable multivibrator GPM to generate a narrow guard pulse and also initiates a timing cycle in a variable delay circuit VDS. The guard pulse sets a bistable latch (not shown) in a PWM LOGIC circuit which applies a signal to a drive current regulator DCR to initate a base drive current control pulse to power switch PS to generate the leading edge of each variable duty cycle voltage pulse to motor 10. After a selectively variable time interval, controlled by a speed potentiometer SPEED POT, whose setting is regulated by a foot pedal or truck LT, the variable delay circuit VDS provides a timing signal on a lead to the PWM LOGIC circuit which resets the bistable latch therein to terminate the control pulse to current switching regulator DCR and thus turn off power switch PS.

A free wheeling diode FWD in shunt to the series arrangement of motor armature A and field winding FLD provides a path for the inductive motor current during the interpulse period when power switch PS is open. An armature diode AD connected in shunt to motor armature A provides a path for armature current flow during braking.

When the direction lever on truck LT is operated to reverse the forward contactor and the reverse contactor and thereby reverse the polarity of motor field winding FLD, the truck may continue in the same direction of travel for some time after the polarity of field winding FLD is reversed. Under such condition, motor 10 acts as a generator and dynamically brakes the motor, and armature current flows through diode AD. In order to prevent severe, abrupt plugging of truck LT, a plugging reed relay PR senses the magnitude of current flowing through armature diode AD and triggers a PLUG MODE circuit to reduce the percent on-time of power switch PS and thereby reduce excitation of field winding FLD to provide the reduction in armature current necessary for smooth plugging of motor 10.

The magnitude of armature current flowing through armature diode AD is a function of the excitation of field winding FLD and the rpm of armature A. Field excitation is a function of the magnitude of current flowing through power switch PS. When motor 10 acts as a generator, a small change in current through field winding FLD will result in a large change of armature current. Higher armature current results in faster reversal of motor 10 and more severe plugging. Smooth plugging can facilely be accomplished when the magnitude of armature current is low. When the magnitude of current through armature diode AD reaches a predetermined magnitude which calls for plugging, plugging relay PR triggeres the PLUG MODE circuit which actuates the oscillator OSC to reduce the frequency of oscillator triggering pulses, thereby reducing the percent on-time, or duty cycle of power switch PS to lower values than that utilized during normal operation. Such reduction in oscillator frequently with consequent reduced percent duty cycle lowers the excitation of field winding FLD and thereby provides the reduction in armature current necessary for smooth plugging.

Plugging relay PR may be a known commercially available reed switch wherein a sealed glass cylinder 12 encloses a pair of normally open cooperable contacts 14 of ferromagnetic material adapted to make and break an electrical circuit and to close when disposed in a field of predetermined magnetic flux density. Plugging reed relay PR is positioned in the magnetic field generated by the current flowing through armature diode AD. Preferably armature diode AD, plugging relay PR and free wheeling diode FWD are integrally assembled on a control panel, or static panel 15 of lift truck LT. Panel 15 may also have mounted thereon a control circuit module CC, a plurality of drive regulator modules DCR, and a plurality of power switch modules PS. Static panel 15 is preferably secured to the back of a normally vertically compartment door 17 which is hinged to a lower side panel 18 of the truck LT between the front and rear truck wheels W so that door 17 can be opened to the horizontal position to expose the static panel 15 for easy repair and maintenance. When compartment door 17 is closed, control panel 15 is pivoted ninety degrees from the position shown in FIG. 1 to a position wherein relay PS is disposed adjacent electrical cables carrying chopped d.c. current of high magnitude which generate magnetic fields that, in the absence of the invention, may cause faulty operation of plugging relay PR. One electrical cable disposed near static panel 15 when door 17 is closed may be the conductor X between the positive battery terminal and the free wheeling diode FWD. A second electrical cable disposed adjacent static panel 15 when door 17 is closed is the conductor Y beteween armature A and the free wheeling diode FWD. Still another electrical cable carrying heavy chopped d.c. electrical current disposed near static panel 15 when door 17 is closed may be the conductor Z between the contacts of the forward and reverse contactors and the motor armature A. Power switch PS may carry d.c. currents up to 750 amperes in magnitude, and such currents may typically be chopped by power switch PS at frequencies of approximately 30 to 300 cycles per second. Absent the present invention, the magnetic fields generated by currents in such cables X, Y and Z may undesirably influence and cause faulty operation of plugging reed relay PR and thereby result in erratic plugging of motor 10.

In accordance with the invention, a current carrying and shielding link RL of ferromagnetic material having relatively high conductivity such as steel is connected in electrical series relation with armature diode AD. Link RL has a U-shaped portion 19 forming a transversely extending slot intermediate its ends in which plugging reed relay PR is disposed. The cross piece 20 of the U-shaped portion 19 is of constricted, reduced cross sectional area. Plugging reed relay PR may be assembled to link RL so that glass cylinder 12 touches the bottom of U-shaped slot 19 and may be secured thereto with a suitable potting compound 22. Link RL may have clearance holes 24 adjacent its ends which receive threaded studs 25 of a terminal block 26 of panel 15 which are also connected to leads to electrodes of armature diode AD and free wheeling diode FWD so that the unitary assembly of link RL and plugging relay PR is integrally mounted on static panel 15 with the armature diode and free wheeling diode.

The current through armature diode AD also flows through the reduced cross sectional area, constricted portion 20 of link RL so that the magnetic field generated thereby is concentrated in constricted portion 20, thereby increasing the flux density of the magnetic field generated by the armature diode current. The leads 30 from the contacts 14 of plugging reed relay PR may extend upward from link RL and be connected to a connector 31 which is electrically coupled to the PLUG MODE circuit.

The unitary assembly of current carrying and shielding link RL with reed relay PR has high sensitivity in detecting the magnitude of current flow through armature diode AD and provides uniform and consistent plugging of motor 10. The constricted portion 20 of link RL results in relatively high magnetic flux densities at relatively low values of current flow through armature diode AD with the result that the external magnetic fields generated by currents flowing in adjacent electrical cables such as X, Y and Z have little or no influence on reed relay PR and cannot cause erratic plugging of motor 10. Further, the electrical resistance of the steel material of link RL is approximately eighty times higher than that of copper so that link RL limits the maximum magnitude of commutating current that can flow through armature diode AD during the interpulse period which power switch PS is open.

In alternative embodiments of the invention, the current carrying and shielding link RL is connected in series with the free wheeling diode FWD instead of the armature diode so that plugging reed relay RL senses the magnitude of current through diode FWD and actuates the PLUG MODE circuit to reduce oscillator frequency in order to accomplish smooth plugging of motor 10.

While only a single embodiment of my invention has been illustrated and described, many modifications and variations thereof will be readily apparent to those skilled in the art, and consequently it should be understood that I do not intend to be limited to the particular embodiment shown and described.

The embodiments of the invention in which an exclusive property of privilege is claimed are defined as follows:

1. In a vehicle driven by a d.c. traction motor energized from a battery and having a time-ratio control for selectively varying the average voltage applied from said battery to said motor to thereby regulate the speed of said motor, a diode in shunt to the inductive path of said motor, and motor plugging means for actuating said time-ratio control to reduce the average voltage supplied by said battery to said motor and thereby dynamically brake the rotation of said motor, the improvement comprising plug current sensor means for sensing the magnitude of current flowing through said diode when said motor is acting as a generator including a ferromagnetic current carrying and shielding member having a generally U-shaped indentation therein and also having a constricted neck portion of reduced cross section defining one of the walls of said U-shaped indentation and being connected in series with said diode so that the current through said diode also flows through said neck portion and a reed switch having a hollow casing of insulating material enclosing a pair of cooperable contacts movable to make and break an electrical circuit and being adapted to control said motor plugging means and to operate said contacts when disposed in a magnetic field of predetermined magnetic flux density, said reed switch being positioned in said indentation adjacent said neck portion so that it is within the magnetic field generated by current flowing through said neck portion.

2. In the combination of claim 1 wherein said diode is an armature diode connected in shunt to the armature of said motor.

3. In the combination of claim 2 wherein said diode is a free wheeling diode connected in shunt to the series connection of said motor armature and motor field winding.

4. In the combination of claim 1 wherein said U-shaped indentation extends transversely of the length of said current carrying and shielding member and said constricted neck portion forms the bottom leg of said U-shaped indentation.

5. In the combination of claim 1 wherein said time-ratio control comprises a pulse width modulation system having an oscillator which determines the pulse frequency, and wherein said motor plugging means reduces the frequency of the output pulses from said oscillator to smoothly dynamically brake said motor.

6. In a vehicle driven by a d.c. traction motor energized from a battery through a time-ratio control to regulate the average voltage supplied to said motor and having plugging means for operating said time-ratio control to reduce the average voltage supplied from said battery to said motor to dynamically brake said motor, the combination of a diode in shunt to the inductive motor path, a ferromagnetic current carrying and shielding member having a generally U-shaped section and also having a constricted neck portion of reduced cross section defining one of the walls of said U-shaped section and being connected in electrical series relation with said diode so that the current through said diode also flows through said neck portion, and a reed switch having a hollow casing of insulating material enclosing a pair of cooperable contacts which are operable to make and break an electrical circuit and are adapted to control said plugging means, said reed switch being adapted to operate said contacts when positioned in a magnetic field of predetermined magnetic flux density and being disposed within said U-shaped section adjacent said constricted neck portion so that it is within the magnetic field generated by the current flowing through said neck portion.

7. In the combination of claim 6 wherein said diode is an armature diode connected in shunt to the armature of said traction motor.

8. In the combination of claim 7 wherein said diode is a free wheeling diode connected in shunt to the series arrangement of the armature and field winding of said motor.

9. A control panel for a vehicle traction motor energized from a battery and having plugging means to dynamically brake said motor and electrical cables disposed adjacent said panel carrying currents which generate external magnetic fields, said control panel including the unitary assembly of a free wheeling diode for connection in parallel to the series arrangement of the armature and field winding of said motor, an armature diode for connection in shunt to the armature of said motor, and a plug current sensor including a reed relay for detecting when the current through one of said diodes reaches a predetermined magnitude for controlling said plugging means, said plug current sensor also including a ferromagentic shielding and current carrying link assembled on said panel so that it is in electrical series relation with one of said diodes and having a transverse depression therein and a constricted portion of reduced cross sectional area defining one of the walls of said depression, said reed relay being disposed in said depression so that its contacts are operated by the magnetic field generated by the current flowing through said link member and which field is concentrated in said constricted portion.

* * * * *